(12) United States Patent
Kojima

(10) Patent No.: US 9,650,534 B2
(45) Date of Patent: May 16, 2017

(54) PRIMER FOR ELECTROLESS PLATING COMPRISING HYPERBRANCHED POLYMER AND METAL FINE PARTICLES

(75) Inventor: Keisuke Kojima, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 219 days.

(21) Appl. No.: 14/111,396

(22) PCT Filed: Apr. 11, 2012

(86) PCT No.: PCT/JP2012/059901
§ 371 (c)(1),
(2), (4) Date: Nov. 20, 2013

(87) PCT Pub. No.: WO2012/141215
PCT Pub. Date: Oct. 18, 2012

(65) Prior Publication Data
US 2014/0072822 A1 Mar. 13, 2014

(30) Foreign Application Priority Data

Apr. 12, 2011 (JP) .................................. 2011-088587
Jul. 14, 2011 (JP) .................................. 2011-156026
Oct. 21, 2011 (JP) .................................. 2011-231910

(51) Int. Cl.
*C09D 125/00* (2006.01)
*C08F 12/00* (2006.01)
(Continued)

(52) U.S. Cl.
CPC ............ *C09D 125/06* (2013.01); *C08F 12/26* (2013.01); *C08F 12/30* (2013.01); *C08F 12/32* (2013.01);
(Continued)

(58) Field of Classification Search
CPC ........ C09D 125/06; C08F 12/26; C08F 12/30; C08F 12/32; C08F 2438/03; C08J 7/047;
(Continued)

(56) References Cited

U.S. PATENT DOCUMENTS

| 8,227,022 | B2* | 7/2012 | Magdassi | .............. | B22F 1/0018 |
| | | | | | 23/305 R |
| 2010/0009206 | A1 | 1/2010 | Ataka et al. | | |
| 2010/0048845 | A1* | 2/2010 | Yasui | ........................ | C08F 2/38 |
| | | | | | 526/204 |

FOREIGN PATENT DOCUMENTS

| JP | A-2004-091708 | 3/2004 |
| JP | A-2008-007849 | 1/2008 |

(Continued)

OTHER PUBLICATIONS

Dec. 1, 2014 Office Action issued in Chinese Application No. 201280014536.8.
(Continued)

*Primary Examiner* — Harold Pyon
*Assistant Examiner* — Danny N Kang
(74) *Attorney, Agent, or Firm* — Oliff PLC

(57) ABSTRACT

There is provided a novel, environmentally friendly primer for use in the pretreatment steps in electroless plating, which can be easily used in fewer steps with a lower cost. A primer for forming a metallic plating film on a substrate by electroless plating, the primer including: a hyperbranched polymer having an ammonium group at a molecular terminal and a weight-average molecular weight of 500 to 5,000,000; and a metal fine particle.

18 Claims, 2 Drawing Sheets

(51) Int. Cl.
*C23C 18/16* (2006.01)
*C09D 125/06* (2006.01)
*C08F 12/26* (2006.01)
*C08F 12/30* (2006.01)
*C08F 12/32* (2006.01)
*C23C 18/28* (2006.01)
*C23C 18/30* (2006.01)
*C23C 18/18* (2006.01)
*C23C 18/20* (2006.01)
*C08L 101/00* (2006.01)
*C08J 7/04* (2006.01)
*C23C 18/32* (2006.01)
*C23C 18/42* (2006.01)
*C23C 18/38* (2006.01)
*C23C 18/52* (2006.01)
*C08G 83/00* (2006.01)

(52) U.S. Cl.
CPC .......... C08J 7/047 (2013.01); C08L 101/005 (2013.01); C23C 18/1608 (2013.01); C23C 18/1831 (2013.01); C23C 18/1834 (2013.01); C23C 18/1879 (2013.01); C23C 18/1882 (2013.01); C23C 18/206 (2013.01); C23C 18/2066 (2013.01); C23C 18/285 (2013.01); C23C 18/30 (2013.01); *C08F 2438/03* (2013.01); *C08G 83/006* (2013.01); *C08J 2367/02* (2013.01); *C08J 2400/202* (2013.01); *C23C 18/32* (2013.01); *C23C 18/38* (2013.01); *C23C 18/42* (2013.01); *C23C 18/52* (2013.01); *Y10T 428/12063* (2015.01)

(58) Field of Classification Search
CPC .............. C08J 2367/02; C08J 2400/202; C08L 101/005; C23C 18/1608; C23C 18/1831; C23C 18/1834; C23C 18/1879; C23C 18/32; C23C 18/38; C23C 18/1882; C23C 18/206; C23C 18/285; C23C 18/30; C23C 18/42; C23C 18/52; Y10T 428/12063; C08G 83/006
USPC ........... 252/500; 428/553; 427/404; 524/577
See application file for complete search history.

(56) References Cited

FOREIGN PATENT DOCUMENTS

WO   WO 2009/031594 A1   3/2009
WO   WO 2010/021386 A1   2/2010

OTHER PUBLICATIONS

Jun. 19, 2012 Written Opinion issued in International Application No. PCT/JP2012/059901.
Jun. 21, 2016 Office Action issued in European Application No. 12 772 0175.3.

* cited by examiner

PRIMER FOR ELECTROLESS PLATING COMPRISING HYPERBRANCHED POLYMER AND METAL FINE PARTICLES

TECHNICAL FIELD

The present invention relates to a primer for electroless plating comprising a hyperbranched polymer and metal fine particles.

BACKGROUND ART

Electroless plating is widely employed in various fields including decorating applications where a luxurious and aesthetic appearance is imparted to a resin molded article for an automotive part and the like, electromagnetic shielding, and wiring technology for a printed circuit board, a large scale integrated circuit, and the like. The reason is that electroless plating can produce a film with a uniform thickness regardless of the kind and shape of the substrate by simply immersing the substrate in a plating solution and can produce a metallic plating film also on a nonconductor such as plastic, ceramic, and glass.

Generally, when a metallic plating film is formed on a substrate (an object to be plated) by electroless plating, a pretreatment for electroless plating is carried out so as to increase adhesion between the substrate and the metallic plating film. Specifically, the surface to be treated is roughened and/or hydrophilized by various etching means, followed by sensitization where an adsorbing substance that promotes adsorption of a plating catalyst on the surface to be treated is provided on the surface to be treated and activation where the plating catalyst is allowed to adsorb on the surface to be treated. Typically, sensitization involves immersion of the object to be treated in an acidic solution of stannous chloride to promote deposition of the metal ($Sn^{2+}$) capable of acting as a reducing agent on the surface to be treated. The sensitized surface to be treated is immersed in an acidic solution of palladium chloride for activation. In this step, the palladium ion in the solution is reduced by the metal that is a reducing agent (tin ion: $Sn^{2+}$) and deposited on the surface to be treated as an active palladium catalyst nucleus. After this pretreatment, the substrate is immersed in an electroless plating solution to form a metallic plating film on the surface to be treated.

Hyperbranched polymers are classified as dendritic polymers and have intentionally introduced branches, the most prominent feature of which is a large number of terminal groups. If the terminal groups are imparted with reactive functional groups, the polymer has reactive functional groups highly densely and is expected to find use as, for example, a highly sensitive scavenger for functional substances such as catalysts, a sensitive multifunctional cross-linking agent, or a dispersing or coating agent for metals or metal oxides.

For example, an example has been disclosed where a composition containing a hyperbranched polymer having an ammonium group and metal fine particles is used as a reduction catalyst (Patent Document 1).

PRIOR ART DOCUMENT

Patent Document

Patent Document 1: WO 2010/021386 pamphlet

SUMMARY OF THE INVENTION

Problem to be Solved by the Invention

As described above, in the conventional electroless plating process, a chromium compound (chromic acid) is used in the roughening step carried out in the pretreatment and the many steps involved in the pretreatment, and thus the electroless plating process needs some improvements in terms of the environmental impact, the costs, and the troublesome operation.

As the technology for molding a resin housing has recently improved, a method of plating the surface of a finely produced housing as-is required. In particular, due to fine electronic circuit formation and faster transmission of electric signals, a method of performing electroless plating that provides a highly adhesive plating film on a smooth substrate is required.

The present invention focuses on these problems and aims to provide a novel, environmentally friendly primer for use in the pretreatment steps in electroless plating, which can be easily used in fewer steps with a lower cost.

Means for Solving the Problems

As a result of intensive study to achieve the objects, the inventors of the present invention have found that a layer obtained by combining a hyperbranched polymer having an ammonium group at a molecular terminal and metal fine particles and coating a substrate with the combination has superior platability and adhesion as a priming layer for electroless metal plating and completed the present invention.

Specifically, according to a first aspect, the present invention relates to a primer for forming a metallic plating film on a substrate by electroless plating, the primer comprising: a hyperbranched polymer having an ammonium group at a molecular terminal and a weight-average molecular weight of 500 to 5,000,000; and a metal fine particle.

According to a second aspect, the present invention relates to the primer according to the first aspect, where the ammonium group of the hyperbranched polymer is attached to the metal fine particle to form a complex.

According to a third aspect, the present invention relates to the primer according to the first aspect or the second aspect, where the hyperbranched polymer is a hyperbranched polymer of Formula [1]:

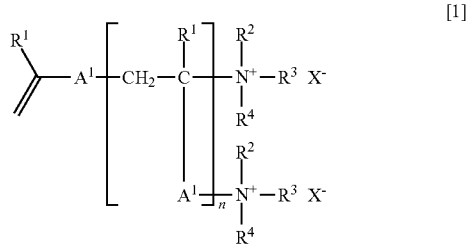

(where $R^1$ are each independently a hydrogen atom or a methyl group; $R^2$, $R^3$, and $R^4$ are each independently a hydrogen atom, a linear, branched, or cyclic alkyl group having a carbon atom number of 1 to 20, a $C_{7-20}$ arylalkyl group, or —$(CH_2CH_2O)_mR^5$ (where $R^5$ is a hydrogen atom or a methyl group; and m is an integer of 2 to 100) (where the alkyl group and the arylalkyl group are optionally substituted with an alkoxy group, a hydroxy group, an ammonium group, a carboxy group, or a cyano group), or two groups of $R^2$, $R^3$, and $R^4$ together represent a linear, branched, or cyclic alkylene group, or $R^2$, $R^3$, and $R^4$ together with a nitrogen atom to which $R^2$, $R^3$, and $R^4$ are attached optionally form a ring; $X^-$ is an anion; n is the number of repeating unit structures and an integer of 2 to 100,000; and $A^1$ is a structure of Formula [2]:

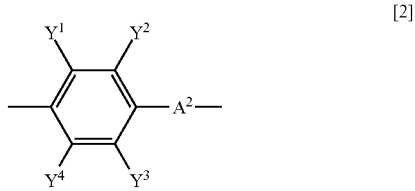

[2]

(where $A^2$ is a linear, branched, or cyclic alkylene group having a carbon atom number of 1 to 30 optionally containing an ether bond or an ester bond; and $Y^1$, $Y^2$, $Y^3$, and $Y^4$ are each independently a hydrogen atom, a $C_{1-20}$ alkyl group, a $C_{1-20}$ alkoxy group, a nitro group, a hydroxy group, an amino group, a carboxy group, or a cyano group)).

According to a fourth aspect, the present invention relates to the primer according to the third aspect, where the hyperbranched polymer is a hyperbranched polymer of Formula [3]:

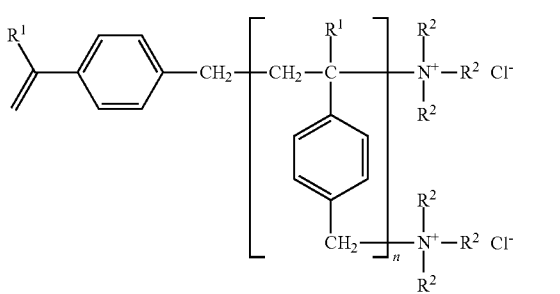

[3]

(where $R^1$, $R^2$, and n have the same meanings as described above).

According to a fifth aspect, the present invention relates to the primer according to any one of the first aspect to the fourth aspect, where the metal fine particle is a fine particle of at least one selected from the group consisting of iron (Fe), cobalt (Co), nickel (Ni), copper (Cu), palladium (Pd), silver (Ag), tin (Sn), platinum (Pt), and gold (Au).

According to a sixth aspect, the present invention relates to the primer according to the fifth aspect, where the metal fine particle is a palladium fine particle.

According to a seventh aspect, the present invention relates to the primer according to the fifth aspect or the sixth aspect, where the metal fine particle has an average particle diameter of 1 to 100 nm.

According to an eighth aspect, the present invention relates to the primer according to any one of the first aspect to the seventh aspect, where the primer is a primer for forming a metallic plating film on a nonconducting substrate by electroless plating.

According to a ninth aspect, the present invention relates to the primer according to any one of the first aspect to the seventh aspect, where the primer is a primer for forming a metallic plating film on a conducting substrate by electroless plating.

According to a tenth aspect, the present invention relates to a priming layer for electroless plating, obtained by forming a layer of the primer as described in any one of the first aspect to the ninth aspect.

According to an eleventh aspect, the present invention relates to a metallic plating film, formed by performing electroless plating on the priming layer for electroless plating as described in the tenth aspect, on the priming layer.

According to a twelfth aspect, the present invention relates to a metal-coated substrate comprising: a substrate; the priming layer for electroless plating as described in the tenth aspect formed on the substrate; and the metallic plating film as described in the eleventh aspect formed on the priming layer for electroless plating.

According to a thirteenth aspect, the present invention relates to the metal-coated substrate according to the twelfth aspect, where the substrate is a nonconducting substrate.

According to a fourteenth aspect, the present invention relates to the metal-coated substrate according to the twelfth aspect, where the substrate is a conducting substrate.

According to a fifteenth aspect, the present invention relates to a method for forming a metal-coated substrate, the method comprising: a step A: coating a substrate with the primer as described in any one of the first aspect to the ninth aspect to form a priming layer; and a step B: immersing the substrate having the priming layer in an electroless plating bath to form a metallic plating film.

According to a sixteenth aspect, the present invention relates to the method according to the fifteenth aspect, where the substrate is a nonconducting substrate.

According to a seventeenth aspect, the present invention relates to the method according to the fifteenth aspect, where the substrate is a conducting substrate.

Effects of the Invention

The primer of the present invention can be applied on a substrate simply to form a priming layer for electroless metal plating easily. The primer of the present invention can form a priming layer having superior adhesion to the substrate. Further more, the primer of the present invention can provide a fine line having a width on the order of micrometers, which makes the primer suitable for various wiring technologies.

A metallic plating film can be easily formed only by immersing a priming layer for electroless metal plating formed from the primer of the present invention in an electroless plating bath, and a metal-coated substrate comprising a substrate, a priming layer, and a metallic plating film can be easily obtained.

The metallic plating film has superior adhesion to the underlying priming layer.

Specifically, the primer of the present invention may be used to form a priming layer on a substrate, which leads to the formation of a metallic plating film having superior adhesion to the substrate.

MODES FOR CARRYING OUT THE INVENTION

Figure 1:
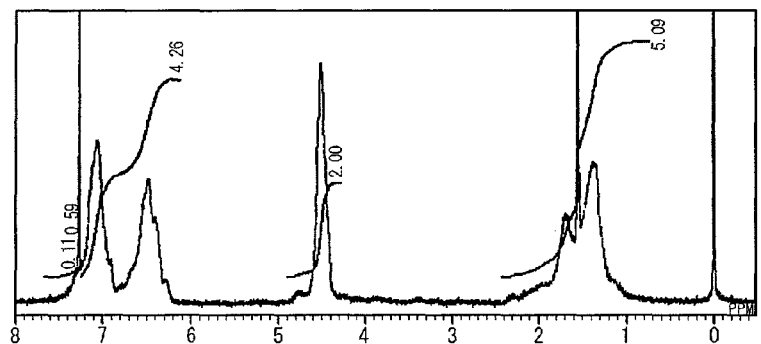
FIG. 1 is a $^1$H NMR spectrum of a hyperbranched polymer having a chlorine atom at a molecular terminal (HPS-Cl) obtained in Synthesis Example 1.

The present invention will be described in more detail.

The primer of the present invention comprises a hyperbranched polymer having an ammonium group and a weight-average molecular weight of 500 to 5,000,000 and metal fine particles.

The primer of the present invention is suitably used as a primer for forming a metallic plating film on a substrate by electroless plating.

[Primer]

<Hyperbranched Polymer>

The hyperbranched polymer for use in the primer of the present invention is a polymer having an ammonium group at a molecular terminal and a weight-average molecular weight of 500 to 5,000,000. Specific examples thereof include a hyperbranched polymer of Formula [1]:

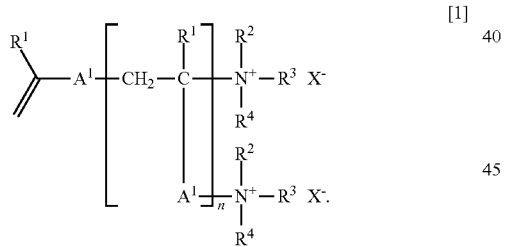

In Formula [1], $R^1$ are each independently a hydrogen atom or a methyl group.

$R^2$, $R^3$, and $R^4$ are each independently a hydrogen atom, a linear, branched, or cyclic alkyl group having a carbon atom number of 1 to 20, a $C_{7-20}$ arylalkyl group, or —(CH$_2$CH$_2$O)$_m$R$^5$ (where $R^5$ is a hydrogen atom or a methyl group; and m is an integer of 2 to 100). The alkyl group and the arylalkyl group are optionally substituted with an alkoxy group, a hydroxy group, an ammonium group, a carboxy group, or a cyano group. Alternatively, two groups of $R^2$, $R^3$, and $R^4$ together represent a linear, branched, or cyclic alkylene group, or $R^2$, $R^3$, and $R^4$ together with the nitrogen atom to which they are attached may form a ring.

$X^-$ is an anion, and n is the number of repeating unit structures and an integer of 2 to 100,000.

Examples of the linear $C_{1-20}$ alkyl group in $R^2$, $R^3$, and $R^4$ include a methyl group, ethyl group, n-propyl group, n-butyl group, n-pentyl group, n-hexyl group, n-heptyl group, n-octyl group, n-nonyl group, n-decyl group, n-undecyl group, n-dodecyl group, n-tridecyl group, n-tetradecyl group, n-pentadecyl group, n-hexadecyl group, n-heptadecyl group, n-octadecyl group, n-nonadecyl group, and n-eicosyl group. A group having eight or more carbon atoms is preferred because the primer with such a group is sparingly soluble in an electroless plating solution and, in particular, an n-octyl group is preferred. Examples of the branched alkyl group include an isopropyl group, isobutyl group, sec-butyl group, and tert-butyl group. Examples of the cyclic alkyl group include groups having a cyclopentyl ring or cyclohexyl ring structure.

Examples of the $C_{7-20}$ arylalkyl group in $R^2$, $R^3$, and $R^4$ include a benzyl group and phenethyl group.

Examples of the linear alkylene group that two groups of $R^2$, $R^3$, and $R^4$ together form include a methylene group, ethylene group, n-propylene group, n-butylene group, and n-hexylene group. Examples of the branched alkylene group include an isopropylene group, isobutylene group, and 2-methylpropylene group. Examples of the cyclic alkylene group include monocyclic, multicyclic, bridged cyclic $C_{3-30}$ alicyclic aliphatic groups. Specific examples thereof include groups having four or more carbon atoms and monocyclic, bicyclic, tricyclic, tetracyclic, or pentacyclic structures. These alkylene groups may contain a nitrogen atom, a sulfur atom, or an oxygen atom in the groups.

The ring that $R^2$, $R^3$, and, $R^4$ together with the nitrogen atom to which they are attached form in the structure of Formula [1] may contain a nitrogen atom, a sulfur atom, or an oxygen atom in the ring, and examples thereof include a pyridine ring, pyrimidine ring, pyrazine ring, quinoline ring, and bipyridyl ring.

Preferable examples of the anion $X^-$ include a halogen atom, PF$_6^-$, BF$_4^-$, or a perfluoroalkane sulfonate.

In Formula [1], $A^1$ is a structure of Formula [2]:

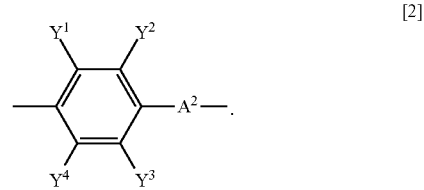

In Formula [2], $A^2$ is a linear, branched, or cyclic alkylene group having a carbon atom number of 1 to 30 optionally containing an ether bond or an ester bond.

$Y^1$, $Y^2$, $Y^3$, and $Y^4$ are each independently a hydrogen atom, a $C_{1-20}$ alkyl group, a $C_{1-20}$ alkoxy group, a nitro group, a hydroxy group, an amino group, a carboxy group, or a cyano group.

Specific examples of the alkylene group of $A^2$ include linear alkylene groups including a methylene group, ethylene group, n-propylene group, n-butylene group, and n-hexylene group, and branched alkylene groups including an isopropylene group, isobutylene group, and 2-methylpropylene group. Examples of the cyclic alkylene group include monocyclic, multicyclic, and bridged cyclic $C_{3-30}$ alicyclic aliphatic groups. Specific examples thereof include groups having four or more carbon atoms and monocyclic, bicyclic, tricyclic, tetracyclic, pentacyclic structures. For example, structural examples of the alicyclic moieties (a) to (s) in the alicyclic aliphatic groups are shown below:

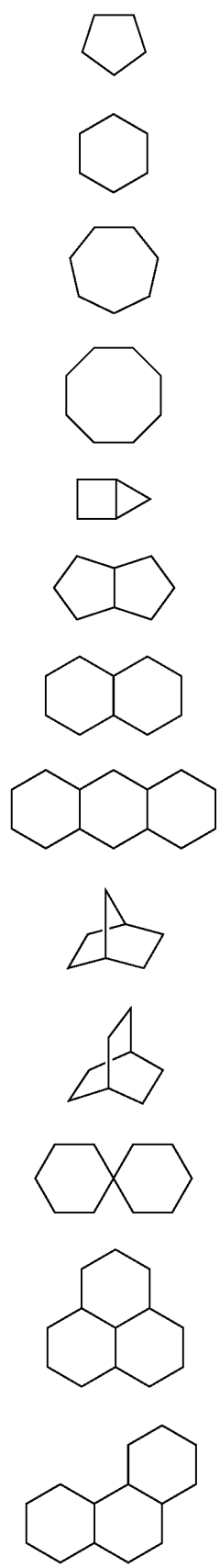

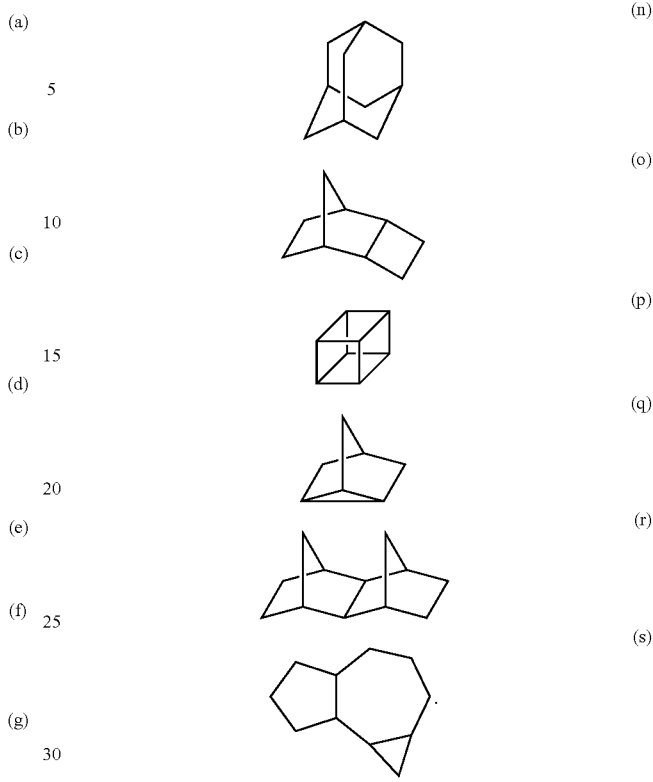

In Formula [2] above, examples of the $C_{1\text{-}20}$ alkyl group of $Y^1$, $Y^2$, $Y^3$, and $Y^4$ include a methyl group, ethyl group, isopropyl group, cyclohexyl group, and n-pentyl group. Examples of the $C_{1\text{-}20}$ alkoxy group include a methoxy group, ethoxy group, isopropoxy group, cyclohexyloxy group, and n-pentyloxy group. $Y^1$, $Y^2$, $Y^3$, and $Y^4$ are preferably each independently a hydrogen atom or a $C_{1\text{-}20}$ alkyl group.

Preferably, $A^1$ is a structure of Formula [4]:

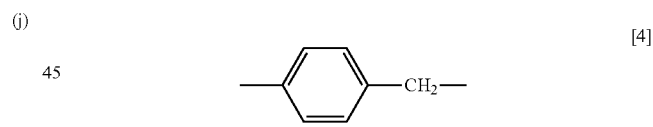

Examples of the hyperbranched polymer for use in the present invention include a hyperbranched polymer of Formula [3]:

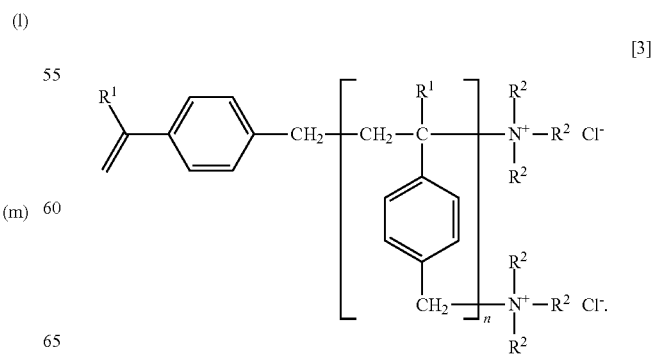

In Formula [3], $R^1$, $R^2$, and n have the same meanings as described above.

A hyperbranched polymer for use in the present invention having an ammonium group at a molecular terminal can be obtained, for example, by allowing a hyperbranched polymer having a halogen atom at a molecular terminal to react with an amine compound.

A hyperbranched polymer having a halogen atom at a molecular terminal can be manufactured from a hyperbranched polymer having a dithiocarbamate group at a molecular terminal according to the description of WO 2008/029688 pamphlet. The hyperbranched polymer having a dithiocarbamate group at a molecular terminal is commercially available and HYPERTECH (registered trademark) HPS-200 manufactured by NISSAN CHEMICAL INDUSTRIES, LTD. and the like can be suitably used.

Examples of the amine compound that can be used in the reaction include primary amines including aliphatic amines such as methylamine, ethylamine, n-propylamine, isopropylamine, n-butylamine, isobutylamine, sec-butylamine, tert-butylamine, n-pentylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine, n-nonadecylamine, and n-eicosylamine; alicyclic amines such as cyclopentylamine and cyclohexylamine; aralkyl amines such as benzylamine and phenethylamine; and aromatic amines, for example, anilines such as aniline, p-n-butylaniline, p-tert-butylaniline, p-n-octylaniline, p-n-decylaniline, p-n-dodecylaniline, and p-n-tetradecylaniline, naphthylamines such as 1-naphthylamine and 2-naphthylamine, aminoanthracenes such as 1-aminoanthracene and 2-aminoanthracene, aminoanthraquinones such as 1-aminoanthraquinone, aminobiphenyls such as 4-aminobiphenyl and 2-aminobiphenyl, aminofluorenones such as 2-aminofluorene, 1-amino-9-fluorenone, and 4-amino-9-fluorenone, aminoindanes such as 5-aminoindane, aminoisoquinolines such as 5-aminoisoquinoline, and aminophenanthrenes such as 9-aminophenanthrene. Further examples thereof include amine compounds such as N-(tert-butoxycarbonyl)-1,2-ethylenediamine, N-(tert-butoxycarbonyl)-1,3-propylenediamine, N-(tert-butoxycarbonyl)-1,4-butylenediamine, N-(tert-butoxycarbonyl)-1,5-pentamethylenediamine, N-(tert-butoxycarbonyl)-1,6-hexamethylenediamine, N-(2-hydroxyethyl)amine, N-(3-hydroxypropyl)amine, N-(2-methoxyethyl)amine, and N-(2-ethoxyethyl)amine.

Examples of secondary amines include aliphatic amines such as dimethylamine, diethylamine, di-n-propylamine, diisopropylamine, di-n-butylamine, diisobutylamine, di-sec-butylamine, di-n-pentylamine, ethylmethylamine, methyl-n-propylamine, methyl-n-butylamine, methyl-n-pentylamine, ethylisopropylamine, ethyl-n-butylamine, ethyl-n-pentylamine, methyl-n-octylamine, methyl-n-decylamine, methyl-n-dodecylamine, methyl-n-tetradecylamine, methyl-n-hexadecylamine, methyl-n-octadecylamine, ethylisopropylamine, ethyl-n-octylamine, di-n-hexylamine, di-n-octylamine, di-n-dodecylamine, di-n-hexadecylamine, and di-n-octadecylamine; alicyclic amines such as dicyclohexylamine; aralkyl amines such as dibenzylamine; aromatic amines such as diphenylamine; and nitrogen-containing heterocyclic compounds such as phthalimide, pyrrole, piperidine, piperazine, and imidazole. Further examples thereof include bis(2-hydroxyethyl)amine, bis(3-hydroxypropyl)amine, bis(2-ethoxyethyl)amine, and bis(2-propoxyethyl)amine.

Examples of tertiary amines include aliphatic amines such as trimethylamine, triethylamine, tri-n-propylamine, tri-n-butylamine, tri-n-pentylamine, tri-n-octylamine, tri-n-dodecylamine, dimethyl-n-octylamine, diethyl-n-decylamine, dimethyl-n-dodecylamine, dimethyl-n-tetradecylamine, dimethyl-n-hexadecylamine, dimethyl-n-octadecylamine, dimethyl-n-eicosylamine, and dimethyl-n-dodecylamine; and nitrogen-containing heterocyclic compounds such as pyridine, pyrazine, pyrimidine, quinoline, 1-methylimidazole, 4,4'-bipyridyl, and 4-methyl-4,4'-bipyridyl.

The amine compound can be used in the reaction in 0.1 to 20 molar equivalents, preferably 0.5 to 10 molar equivalents, and more preferably 1 to 5 molar equivalents per mole of halogen atom of the hyperbranched polymer having a halogen atom at a molecular terminal.

The reaction of the hyperbranched polymer having a halogen atom at a molecular terminal with the amine compound can be carried out in water or an organic solvent in the presence or absence of a base. The solvent used is preferably capable of dissolving the hyperbranched polymer having a halogen atom at a molecular terminal and the amine compound. A solvent capable of dissolving the hyperbranched polymer having a halogen atom at a molecular terminal and the amine compound and incapable of dissolving a hyperbranched polymer having an ammonium group at a molecular terminal would be more suitable for easy isolation.

Any solvent may be used in the reaction, provided the solvent does not substantially inhibit the reaction from proceeding, and examples thereof include water; alcohols such as isopropanol; organic acids such as acetic acid; aromatic hydrocarbons such as benzene, toluene, xylene, ethylbenzene, and 1,2-dichlorobenzene; ethers such as tetrahydrofuran and diethyl ether; ketones such as acetone, ethyl methyl ketone, isobutyl methyl ketone, and cyclohexanone; halides such as chloroform, dichloromethane, and 1,2-dichloroethane; aliphatic hydrocarbons such as n-hexane, n-heptane, and cyclohexane; and amides such as N,N-dimethylformamide, N,N-dimethylacetamide, and N-methyl-2-pyrrolidone. These solvents may be used alone or in combination of two or more thereof. The mass of the solvent used is 0.2 to 1,000 times, preferably 1 to 500 times, more preferably 5 to 100 times, and most preferably 10 to 50 times the mass of the hyperbranched polymer having a halogen atom at a molecular terminal.

As a suitable base, commonly used are inorganic compounds including alkali metal hydroxides and alkaline-earth metal hydroxides (for example, sodium hydroxide, potassium hydroxide, calcium hydroxide), alkali metal oxides and alkaline-earth metal oxides (for example, lithium oxide, calcium oxide), alkali metal hydrides and alkaline-earth metal hydrides (for example, sodium hydride, potassium hydride, calcium hydride), alkali metal amides (for example, sodium amide), alkali metal carbonates and alkaline-earth metal carbonates (for example, lithium carbonate, sodium carbonate, potassium carbonate, calcium carbonate), and alkali metal bicarbonates (for example, sodium bicarbonate), and organometallic compounds including alkali metal alkyls, alkyl magnesium halides, alkali metal alkoxides, alkaline-earth metal alkoxides, and dimethoxymagnesium. Potassium carbonate and sodium carbonate are particularly suitable. The base is used in 0.2 to 10 molar equivalents, preferably 0.5 to 10 molar equivalents, and most preferably 1 to 5 molar equivalents per mole of halogen atom of the hyperbranched polymer having a halogen atom at a molecular terminal.

Oxygen in the reaction system is preferably thoroughly removed before this reaction is started and inert gases such as nitrogen and argon may be used to purge air from the system. The reaction condition is suitably selected from the reaction time range of 0.01 to 100 hours and the reaction temperature range of 0 to 300° C. Preferably, the reaction time is 0.1 to 72 hours and the reaction temperature is 20 to 150° C.

When a tertiary amine is used, the hyperbranched polymer of Formula [1] can be obtained whether or not a base is present.

When a primary amine or a secondary amine compound is reacted with a hyperbranched polymer having a halogen atom at a molecular terminal in the absence of a base, a corresponding hyperbranched polymer having a terminal ammonium group, i.e., a protonated secondary amine terminal group or a protonated tertiary amine terminal group can be obtained. Even when a base is used in the reaction, the reactants may be mixed with an aqueous solution of an acid such as hydrogen chloride, hydrogen bromide, and hydrogen iodide in an organic solvent to obtain a corresponding hyperbranched polymer having a terminal ammonium group, i.e., a protonated secondary amine terminal group or a protonated tertiary amine terminal group.

The hyperbranched polymer has a weight-average molecular weight Mw of 500 to 5,000,000, preferably 1,000 to 1,000,000, more preferably 2,000 to 500,000, and most preferably 3,000 to 200,000 in terms of polystyrene as measured by gel permeation chromatography. The degree of distribution: Mw (weight–average molecular weight)/Mn (number-average molecular weight) is 1.0 to 7.0, preferably 1.1 to 6.0, and more preferably 1.2 to 5.0.

<Metal Fine Particles>

The metal fine particles for use in the primer of the present invention are not specifically limited, and examples of metal species include iron (Fe), cobalt (Co), nickel (Ni), copper (Cu), palladium (Pd), silver (Ag), tin (Sn), platinum (Pt), and gold (Au). These metals may be used alone, or an alloy of two or more metals may be used. Among these metals, palladium fine particles are included as suitable metal fine particles. Oxides of the metals may also be used as metal fine particles.

The metal fine particles are obtained by reduction of a metal ion, for example, by irradiating an aqueous solution of a metal salt with a high-pressure mercury lamp or adding to the aqueous solution a compound having a reducing action (so-called reducing agent). For example, a metal ion may be reduced by, for example, adding an aqueous solution of a metal salt to a solution dissolving the hyperbranched polymer and irradiating the resultant mixture with ultraviolet light or adding an aqueous solution of a metal salt and a reducing agent to the solution to form a complex of the hyperbranched polymer and the metal fine particles concurrently with the preparation of a primer comprising the hyperbranched polymer and the metal fine particles.

Examples of the metal salt include chloroauric acid, silver nitrate, copper sulfate, copper nitrate, copper acetate, tin chloride, platinous chloride, chloroplatinic acid, $Pt(dba)_2$ [dba=dibenzylideneacetone], $Pt(cod)_2$[cod=1,5-cyclooctadiene], $Pt(CH_3)_2(cod)$, palladium chloride, palladium acetate $(Pd(OC(=O)CH_3)_2)$, palladium nitrate, $Pd_2(dba)_3 \cdot CHCl_3$, $Pd(dba)_2$, and $Ni(cod)_2$.

The reducing agent is not specifically limited. Although various reducing agents may be used, a reducing agent is preferably selected depending on the metal species added in the intended primer and other factors. Examples of the reducing agent that can be used include metal borohydrides such as sodium borohydride and potassium borohydride; aluminum hydrides such as lithium aluminum hydride, potassium aluminum hydride, cesium aluminum hydride, beryllium aluminum hydride, magnesium aluminum hydride, and calcium aluminum hydride; hydrazine compounds; citric acid and salts thereof; succinic acid and salts thereof; ascorbic acid and salts thereof; primary or secondary alcohols such as methanol, ethanol, isopropanol, and polyol; tertiary amines such as trimethylamine, triethylamine, diisopropylethylamine, diethylmethylamine, tetramethylethylenediamine [TMEDA], and ethylenediaminetetraacetic acid [EDTA]; hydroxylamines; and phosphines such as tri-n-propylphosphine, tri-n-butylphosphine, tricyclohexylphosphine, tribenzylphosphine, triphenylphosphine, triethoxyphosphine, 1,2-bis(diphenylphosphino)ethane [DPPE], 1,3-bis(diphenylphosphino)propane [DPPP], 1,1'-bis(diphenylphosphino)ferrocene [DPPF], and 2,2'-bis(diphenylphosphino)-1,1'-binaphthyl [BINAP].

The average particle diameter of the metal fine particles is preferably 1 to 100 nm. The reason is that the surface areas of the metal fine particles decrease, resulting in the decrease in the catalytic activity with an average particle diameter exceeding 100 nm. The average particle diameter is more preferably 75 nm or less and particularly preferably 1 to 30 nm.

The hyperbranched polymer is preferably used for the primer of the present invention in an amount of 50 to 2,000 parts by mass relative to 100 parts by mass of the metal fine particles. If the amount is less than 50 parts by mass, the metal fine particles are insufficiently dispersed, and if the amount exceeds 2,000 parts by mass, the organic contents becomes high, resulting in disadvantageous properties. The amount of the hyperbranched polymer is more preferably 100 to 1,000 parts by mass.

<Primer Comprising Hyperbranched Polymer and Metal Fine Particles>

The primer of the present invention comprises the hyperbranched polymer having an ammonium group at a molecular terminal and the metal fine particles, where the hyperbranched polymer and the metal fine particles preferably form a complex.

As used herein, the term complex means the hyperbranched polymer and the metal fine particles coexist with the ammonium group at the terminal of the hyperbranched polymer being in contact with or in proximity to the metal fine particles to form a particle. In other words, the complex has a structure in which the ammonium group of the hyperbranched polymer is attached to or coordinates with the metal fine particles.

Accordingly, the "complex" in the present invention includes a complex in which the metal fine particles and the hyperbranched polymer are bound to form a discrete complex as well as a complex in which the metal fine particles and the hyperbranched polymer exist independently without forming bonds.

The formation of a complex of the hyperbranched polymer having an ammonium group and the metal fine particles is performed concurrently with the preparation of the primer comprising the hyperbranched polymer and the metal fine particles. Examples of the method include a method in which metal fine particles stabilized to a certain degree with a lower ammonium ligand are synthesized and the ligand is exchanged with the hyperbranched polymer and a method in which a metal ion is directly reduced in a solution of the hyperbranched polymer having an ammonium group to form a complex. Further examples thereof include, as described above, a method in which an aqueous solution of a metal salt is added to a solution of the hyperbranched polymer and the resultant mixture is irradiated with ultraviolet light or a method in which an aqueous solution of a metal salt and a reducing agent are added to the solution to reduce the metal ion to form a complex.

In the ligand exchange method, the raw material that is metal fine particles stabilized to a certain degree with a lower ammonium ligand can be synthesized by the method described in Journal of Organometallic Chemistry 1996, 520, 143 to 162, etc. A hyperbranched polymer having an ammonium group is dissolved in the resultant reaction mixture of the metal fine particles, and the mixture is stirred at room temperature (approximately 25° C.) or stirred with heating to obtain the intended metal fine particle complex.

Any solvent may be used, provided the solvent is capable of dissolving the metal fine particles and the hyperbranched polymer having an ammonium group to the necessary concentrations or more. Specific examples thereof include alcohols such as ethanol, propanol, and isopropanol; halogenated hydrocarbons such as methylene chloride and chloroform; cyclic ethers such as tetrahydrofuran, 2-methyltetrahydrofuran, and tetrahydropyran; nitriles such as acetonitrile and butyronitrile, and a mixture of these. Preferably, tetrahydrofuran is used.

The temperature at which the reaction mixture of the metal fine particles and the hyperbranched polymer having an ammonium group are mixed may be generally from 0° C. to the boiling point of the solvent, and preferably in a range of room temperature (approximately 25° C.) to 60° C.

In the ligand exchange method, a phosphine dispersant (phosphine ligand) may be used instead of the amine dispersant (lower ammonium ligand) to stabilize metal fine particles to a certain degree beforehand.

The direct reduction method involves dissolving a metal ion and a hyperbranched polymer having an ammonium group in a solvent and causing the ingredients to react under hydrogen atmosphere to obtain the intended metal fine particle complex.

The source of the metal ion used includes the above described metal salts and metal carbonyl complexes such as hexacarbonylchromium [$Cr(CO)_6$], pentacarbonyliron [$Fe(CO)_5$], octacarbonyldicobalt [$CO_2(CO)_8$], and tetracarbonylnickel [$Ni(CO)_4$]. Zero-valent metal complexes such as metal olefin complexes, metal phosphine complexes, and metal nitrogen complexes may also be used.

Any solvent may be used, provided the solvent is capable of dissolving the metal ion and the hyperbranched polymer having an ammonium group to the necessary concentrations or more. Specific examples thereof include alcohols such as ethanol and propanol; halogenated hydrocarbons such as methylene chloride and chloroform; cyclic ethers such as tetrahydrofuran, 2-methyltetrahydrofuran, and tetrahydropyran; nitriles such as acetonitrile and butyronitrile, and a mixture of these. Preferably, tetrahydrofuran is used.

The temperature at which the metal ion and the hyperbranched polymer having an ammonium group are mixed may be generally from 0° C. to the boiling point of the solvent.

As the direct reduction method, a metal ion and a hyperbranched polymer having an ammonium group may also be dissolved in a solvent and subjected to thermal decomposition to obtain the intended metal fine particle complex.

The source of the metal ion used includes the above described metal salts, metal complexes such as metal carbonyl complexes and zero-valent complexes, and metal oxides such as silver oxide.

Any solvent may be used, provided the solvent is capable of dissolving the metal ion and the hyperbranched polymer having an ammonium group to the necessary concentrations or more. Specific examples thereof include alcohols such as methanol, ethanol, n-propanol, isopropanol, and ethylene glycol; halogenated hydrocarbons such as methylene chloride and chloroform; cyclic ethers such as tetrahydrofuran, 2-methyltetrahydrofuran, and tetrahydropyran; nitriles such as acetonitrile and butyronitrile; aromatic hydrocarbons such as benzene and toluene, and a mixture of these. Preferably, toluene is used The temperature at which the metal ion and the hyperbranched polymer having an ammonium group are mixed may be generally from 0° C. to the boiling point of the solvent. The temperature is preferably close to the boiling point of the solvent, for example, 110° C. (heating at reflux) in the case of toluene.

The thus-obtained complex of the hyperbranched polymer having an ammonium group and the metal fine particles may be subjected to purification such as reprecipitation and processed into a solid form such as powder.

The primer of the present invention may be in the form of varnish that comprises the hyperbranched polymer having an ammonium group and the metal fine particles (preferably a complex formed from these ingredients) and that is used for forming [a priming layer for electroless plating] as described below.

[Priming Layer for Electroless Plating]

The primer of the present invention may be applied on a substrate to form a priming layer for electroless plating. The present invention is also directed to the priming layer for electroless plating.

The substrate is not specifically limited, and a nonconducting substrate or a conducting substrate may be preferably used.

Examples of the nonconducting substrate include glass, ceramics; polyethylene resin, polypropylene resin, vinyl chloride resin, nylon (polyamide resin), polyimide resin, polycarbonate resin, acrylic resin, PEN (poly(ethylene naphthalate)) resin, PET (poly(ethylene terephthalate)) resin, ABS (acrylonitrile-butadiene-styrene copolymer) resin, epoxy resin, and polyacetal resin; and paper. The nonconducting substrate is suitably used in the form of sheet, film, or the like, and the thickness is not specifically limited.

Examples of the conducting substrate include metals such as an indium tin oxide (ITO), various stainless steels, aluminum and aluminum alloys such as duralumin, iron and iron alloys, copper and copper alloys such as brass, phosphor bronze, cupronickel, and beryllium copper, nickel and nickel alloys, and silver and silver alloys such as nickel silver.

The substrate may also be a three-dimensional molded article.

The specific method to form a priming layer for electroless plating from the primer comprising the hyperbranched polymer having an ammonium group and the metal fine particles involves dissolving or dispersing the hyperbranched polymer having an ammonium group and the metal fine particles (preferably a complex formed from these ingredients) in a suitable solvent to form a varnish, coating a substrate on which a metal plating film is to be formed with the varnish by spin coating; blade coating; dip coating; roll coating; bar coating; die coating; spray coating; ink jet method; pen lithography such as fountain-pen nanolithography (FPN) and dip-pen nanolithography (DPN); relief printing such as letterpress printing, flexography, resin relief printing, contact printing, microcontact printing (μCP), nanoimprinting lithography (NIL), and nanotransfer printing (nTP); intaglio printing such as gravure printing and engraving; planographic printing; stencil printing such as screen printing and mimeograph; offset printing; or the like and evaporating the solvent to be dried to form a thin layer.

Among these coating methods, spin coating, spray coating, ink jet method, pen lithography, contact printing, μCP, NIL, and nTP are preferred. Spin coating has advantages in that a highly volatile solution can be used because a short time is needed for coating and that a highly uniform coating can be obtained. Spray coating needs only a very small amount of vanish to obtain a highly uniform coating, which is very advantageous for industrial production. Ink jet method, pen lithography, contact printing, μCP, NIL, and nTP can form (draw), for example, fine patterns of wiring efficiently, which is very advantageous for industrial production.

Any solvent can be used, provided the solvent dissolves or disperses the complex, and examples thereof include water; aromatic hydrocarbons such as benzene, toluene, xylene, ethylbenzene, chlorobenzene, and dichlorobenzene; alcohols such as methanol, ethanol, and isopropanol; ethers such as tetrahydrofuran, methyltetrahydrofuran, 1,4-dioxane, diethyl ether, diethylene glycol dimethyl ether, and propylene glycol methyl ether; esters such as ethyl acetate; ketones such as acetone, ethyl methyl ketone, isobutyl methyl ketone, cyclopentanone, and cyclohexanone; aliphatic hydrocarbons such as n-heptane, n-hexane, and cyclohexane; halogenated aliphatic hydrocarbons such as 1,2-dichloroethane and chloroform; amides such as N-methyl-2-pyrrolidone, N,N-dimethylformamide, and N,N-dimethylacetamide; and dimethyl sulfoxide. These solvents may be used alone or two or more solvents may be mixed. Glycols such as ethylene glycol, propylene glycol, and butylene glycol may be added to adjust the viscosity of the varnish.

Although the concentration of the complex dissolved or dispersed in the solvent is not limited, the concentration of the complex in the varnish is 0.05 to 90% by mass, preferably 0.1 to 80% by mass.

The method for drying the solvent is not specifically limited, and, for example, a hotplate or an oven can be used to evaporate the solvent under an appropriate atmosphere, i.e., air, inert gas such as nitrogen, or vacuum. This can provide a priming layer having a uniformly coated surface. The baking temperature is not specifically limited, provided the solvent can be evaporated, and a temperature of 40 to 250° C. is preferably used.

[Electroless Plating Process, Metallic Plating Film, Metal-Coated Substrate]

The thus-obtained priming layer for electroless plating formed on the substrate is subjected to electroless plating to form a metallic plating film on the priming layer for electroless plating. The present invention is also directed to the thus-obtained metallic plating film as well as the metal-coated substrate comprising a substrate, a priming layer for electroless plating, and a metallic plating film in this order.

Electroless plating process (step) is not specifically limited, and any commonly known electroless plating process may be used. For example, the common method involves using a commonly known electroless plating solution and immersing a priming layer for electroless plating formed on the substrate in the plating solution (bath).

The electroless plating solution mainly contains a metal ion (a metal salt), a complexing agent, and a reducing agent, and a pH adjusting agent, a pH buffering agent, a reaction accelerator (a second complexing agent), a stabilizer, a surfactant (for, for example, giving a luster to the plating film and improving wettability of the surface to be treated), and other agents are contained as appropriate depending on the application.

Examples of the metal for use for the metallic plating film formed by electroless plating include iron, cobalt, nickel, copper, palladium, silver, tin, platinum, gold, and alloys of these. The metal is suitably selected depending on the purpose.

The complexing agent and the reducing agent may be suitably selected depending on the metal ion.

Alternatively, a commercially available electroless plating solution may be used. For example, electroless nickel plating agent (Melplate NI series) and electroless copper plating agent (Melplate CU series) manufactured by Meltex Inc.; electroless nickel plating solution (ICP Nicoron series), electroless copper plating solution (OPC-700 electroless copper M-K, ATS Addcopper IW), electroless tin plating solution (Substar SN-5), and electroless gold plating solution (Flash Gold 330, Self Gold OTK-IT) manufactured by Okuno Chemical Industries Co., Ltd.; electroless palladium plating solution (Pallet II) and electroless gold plating solution (Dip G series, NC Gold series) manufactured by Kojima Chemicals Co., Ltd.; electroless silver plating solution (S-DIA AG-40) manufactured by SASAKI CHEMICAL CO., LTD.; electroless nickel plating solution (SUMER (registered trademark) series, SUMER (registered trademark) KANIBLACK (registered trademark) series), and electroless palladium plating solution (S-KPD) manufactured by JAPAN KANIGEN CO., LTD. can be suitably used.

In the electroless plating process, temperature, pH, immersion time, concentration of metal ion, the presence or absence of stirring and stirring speed, the presence or absence of feeding of air and oxygen, feeding speed, and the like for plating bath may be adjusted to control the forming speed of a metal film and the thickness of the film.

EXAMPLES

The present invention will be described more specifically with reference to Examples, which are not intended to limit the present invention. In Examples, physical properties of the samples were measured by using the following instruments under the following conditions.
(1) Gel Permeation Chromatography (GPC)
Instrument: HLC-8220GPC available from TOSOH CORPORATION
Column: Shodex (registered trademark) KF-804L+KF-803L available from Showa Denko K.K.
Column temperature: 40° C.
Solvent: tetrahydrofuran
Detector: UV (254 nm), RI
(2) $^1$H NMR Spectra
Instrument: JNM-L 400 available from JEOL Ltd.
Solvent: CDCl$_3$
Internal reference: tetramethylsilane (0.00 ppm)
(3) $^{13}$C NMR Spectra
Instrument: JNM-ECA 700 available from JEOL Ltd.
Solvent: CDCl$_3$
Relaxation reagent: chromium trisacetylacetonate (Cr(acac)$_3$)
Reference: CDCl$_3$ (77.0 ppm)
(4) Inductively Coupled Plasma Atomic Emission Spectroscopy (ICP Atomic Emission Spectroscopy)
Instrument: ICPM-8500 available from SHIMADZU CORPORATION (5) Air Brush (Spray Coating)
Instrument: Revolution HP-TR2 available from Anest Iwata Corporation
Abbreviations for the reagents used are as follows:
HPS: hyperbranched polystyrene [HYPERTECH (registered trademark) HPS-200 manufactured by Nissan Chemical Industries, Ltd.]
IPA: isopropanol
IPE: diisopropyl ether
THF: tetrahydrofuran
MEK: ethyl methyl ketone
PG: propylene glycol
dba: dibenzylideneacetone ($C_6H_5CH=CH-C(=O)-CH=CHC_6H_5$)
PE: polyethylene
PP: polypropylene
PVC: poly(vinyl chloride)
PC: polycarbonate
PET: poly(ethylene terephthalate)
ABS: acrylonitrile-butadiene-styrene copolymer
PI: polyimide
ITO: indium tin oxide.

[Synthesis Example 1] Preparation of HPS-Cl

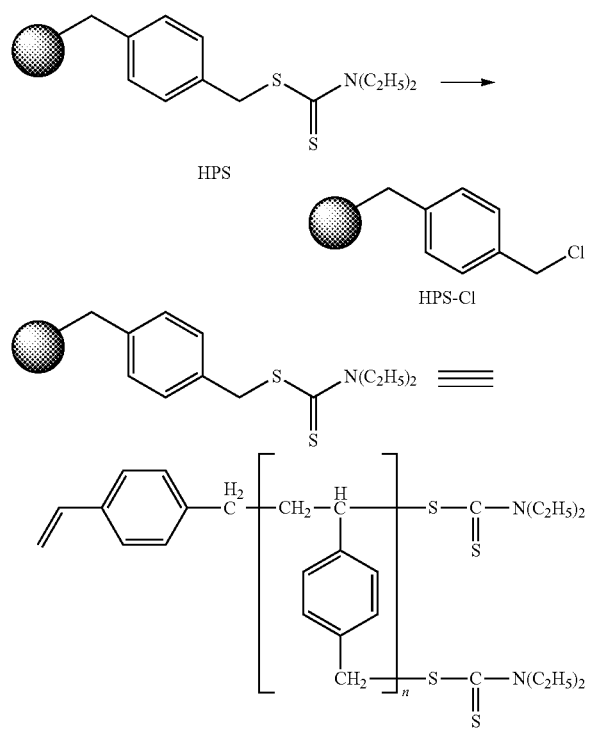

A 500 mL reaction flask was charged with 27 g of sulfuryl chloride [manufactured by KISHIDA CHEMICAL CO., LTD.] and 50 g of chloroform, and the mixture was stirred until uniform. This solution was cooled to 0° C. under nitrogen stream.

Another 300 mL reaction flask was charged with 15 g of an HPS hyperbranched polymer having a dithiocarbamate group at a molecular terminal and 150 g of chloroform, and the mixture was stirred under nitrogen stream until uniform.

The HPS/chloroform solution was added with a feeding pump from the 300 mL flask to the sulfuryl chloride/chloroform solution cooled to 0° C. under nitrogen stream over 60 minutes such that the temperature of the reaction solution was from −5 to 5° C. After the addition was completed, the reaction solution was stirred for 6 hours while the temperature was kept at −5 to 5° C.

A solution of 16 g of cyclohexene [manufactured by Tokyo Chemical Industry Co., Ltd.] in 50 g of chloroform was added to this reaction solution such that the temperature of the reaction solution was from −5 to 5° C. After the addition was completed, this reaction solution was added to 1,200 g of IPA to precipitate the polymer. This precipitate was filtered to collect a white powder, which was dissolved in 100 g of chloroform. The mixture was added to 500 g of IPA to reprecipitate the polymer. This precipitate was filtered under reduced pressure and vacuum-dried to obtain 8.5 g of a hyperbranched polymer having a chlorine atom at a molecular terminal (HPS-Cl) as a white powder (yield 99%).

The $^1H$ NMR spectrum of the obtained HPS-Cl is shown in FIG. 1. Because the peaks assigned to the dithiocarbamate group (4.0 ppm, 3.7 ppm) disappeared, it was found that almost all the dithiocarbamate groups at the molecular terminals of the HPS were replaced with chlorine atoms in the obtained HPS-Cl. The obtained HPS-Cl had a weight-average molecular weight Mw in terms of polystyrene as measured by GPC of 14,000 and a degree of distribution Mw/Mn of 2.9.

[Synthesis Example 2] Preparation of HPS-NEt$_3$Cl

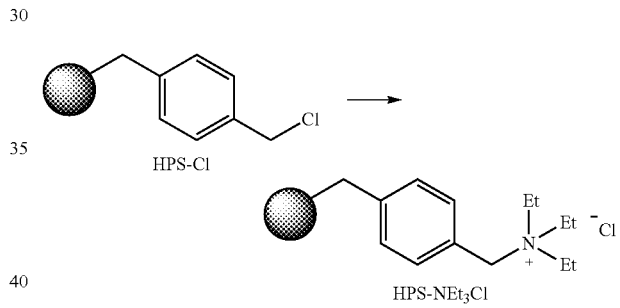

A 50 mL reaction flask equipped with a reflux column was charged with 3.0 g of the HPS-Cl prepared in Synthesis Example 1 (20 mmol), 2.0 g of triethylamine [manufactured by JUNSEI CHEMICAL CO., LTD.] (20 mmol), and 30 mL of a chloroform/ethanol mixture (volume ratio 2:1) and purged with nitrogen. The mixture was heated at reflux with stirring for 48 hours.

After the mixture was cooled to 30° C., the solvent was distilled off. The resultant residue was dissolved in 50 mL of chloroform, and the mixture was added to 200 mL of IPE for purification by reprecipitation. The precipitated polymer was filtered under reduced pressure and vacuum-dried at 40° C. to obtain 6.1 g of a hyperbranched polymer having a triethylammonium group at a molecular terminal (HPS-NEt$_3$Cl) as a pale brown powder.

Figure 2:
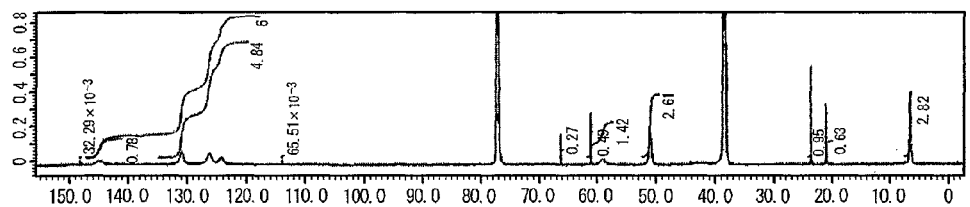
FIG. 2 is a $^{13}$C NMR spectrum of a hyperbranched polymer having a triethylammonium group at a molecular terminal (HPS-NEt$_3$Cl) obtained in Synthesis Example 2.

The $^{13}C$ NMR spectrum of the obtained HPS-NEt$_3$Cl is shown in FIG. 2. The peak of the methylene group attached to the chlorine atom and the peak of the methylene group attached to the ammonium group revealed that 91% of the chlorine atoms at the molecular terminals of the HPS-Cl were replaced with the ammonium groups in the obtained HPS-NEt$_3$Cl. The weight-average molecular weight Mw of the HPS-NEt$_3$Cl was calculated from the Mw of the HPS-Cl (14,000) and the degree of introduction of ammonium group (91%) to be 22,000.

[Synthesis Example 3] Preparation of Pd[HPS-NEt₃Cl]

A 50 mL two-necked flask was charged with 200 mg of the HPS-NEt₃Cl prepared in Synthesis Example 2, 100 mg of Pd₂(dba)₃·CHCl₃ [manufactured by N.E. CHEMCAT Corporation], and 10 mL of a chloroform/ethanol mixture (volume ratio 2:1) and purged with nitrogen. This mixture was stirred at 70° C. for 6 hours.

After the mixture was cooled to 30° C., the solvent was distilled off. The resultant residue was dissolved in 10 mL of chloroform, and the mixture was added to 50 mL of IPE for purification by reprecipitation. The precipitated polymer was filtered under reduced pressure and vacuum-dried at 60° C. to obtain 143 mg of a complex of the hyperbranched polymer having an ammonium group at a molecular terminal and Pd particles (Pd[HPS-NEt₃Cl]) as a black powder.

The result of ICP emission spectroscopy showed that the Pd content of the Pd[HPS-NEt₃Cl] was 19% by mass.

[Synthesis Example 4] Preparation of HPS-NBu₃Cl

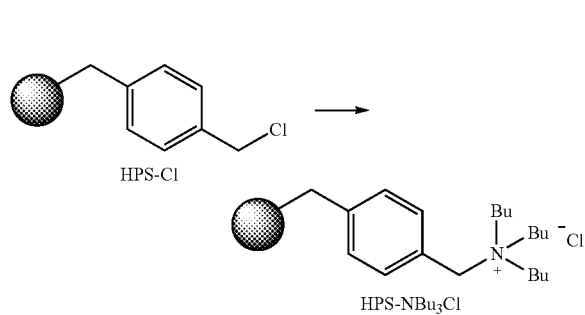

A 50 mL reaction flask equipped with a reflux column was charged with 3.0 g of the HPS-Cl prepared in Synthesis Example 1 (20 mmol), 3.7 g of tributylamine [manufactured by JUNSEI CHEMICAL CO., LTD.] (20 mmol), and 30 mL of a chloroform/ethanol mixture (volume ratio 2:1) and purged with nitrogen. This mixture was heated at reflux with stirring for 48 hours.

After the mixture was cooled to 30° C., the solvent was distilled off. The resultant residue was dissolved in 50 mL of chloroform, and the mixture was added to 200 mL of IPE for purification by reprecipitation. The precipitated polymer was filtered under reduced pressure and vacuum-dried at 40° C. to obtain 5.8 g of a hyperbranched polymer having a tributylammonium group at a molecular terminal (HPS-NBu₃Cl) as a pale brown powder.

Figure 3:
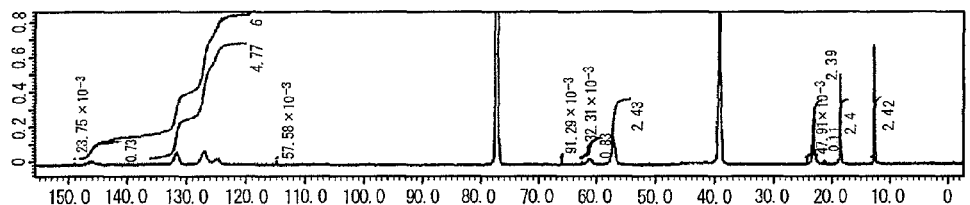
FIG. 3 is a $^{13}$C NMR spectrum of a hyperbranched polymer having a tributylammonium group at a molecular terminal (HPS-NBu$_3$Cl) obtained in Synthesis Example 4.

The $^{13}$C NMR spectrum of the obtained HPS-NBu₃Cl is shown in FIG. 3. The peak of the methylene group attached to the chlorine atom and the peak of the methylene group attached to the ammonium group revealed that 80% of the chlorine atoms at the molecular terminals of the HPS-Cl were replaced with the ammonium groups in the obtained HPS-NBu₃Cl. The Mw of the HPS-NBu₃Cl was calculated from the Mw of the HPS-Cl (14,000) and the degree of introduction of ammonium group (80%) to be 28,000.

[Synthesis Example 5] Preparation of Pd[HPS-NBu₃Cl]

A 50 mL two-necked flask was charged with 200 mg of the HPS-NBu₃Cl prepared in Synthesis Example 4, 100 mg of palladium acetate [manufactured by N.E. CHEMCAT Corporation], and 10 mL of a chloroform/ethanol mixture (volume ratio 2:1) and purged with nitrogen. This mixture was stirred at 70° C. for 6 hours.

After the mixture was cooled to 30° C., the solvent was distilled off. The resultant residue was dissolved in 10 mL of chloroform, and the mixture was added to 50 mL of IPE for purification by reprecipitation. The precipitated polymer was filtered under reduced pressure and vacuum-dried at 60° C. to obtain 167 mg of a complex of the hyperbranched polymer having an ammonium group at a molecular terminal and Pd particles (Pd[HPS-NBu₃Cl]) as a black powder.

The result of ICP emission spectroscopy showed that the Pd content of the Pd[HPS-NBu₃Cl] was 12% by mass.

[Synthesis Example 6] Preparation of HPS-NOct₃Cl

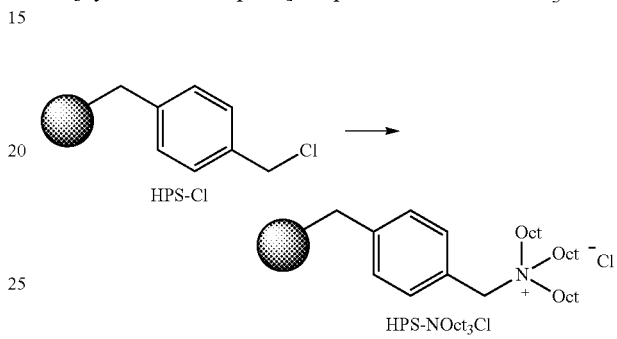

A 100 mL reaction flask equipped with a reflux column was charged with 4.6 g of the HPS-Cl prepared in Synthesis Example 1 (30 mmol), 10.6 g of trioctylamine [manufactured by JUNSEI CHEMICAL CO., LTD.] (30 mmol), and 45 g of chloroform and purged with nitrogen. The mixture was heated at reflux with stirring for 48 hours.

After the mixture was cooled to 30° C., the solvent was distilled off. The resultant residue was dissolved in 150 g of chloroform and cooled to 0° C. The solution was added to 3,000 g of IPE at 0° C. for purification by reprecipitation. The precipitated polymer was filtered under reduced pressure and vacuum-dried at 40° C. to obtain 9.6 g of a hyperbranched polymer having a trioctylammonium group at a molecular terminal (HPS-NOct₃Cl) as a pale yellow powder.

Figure 4:
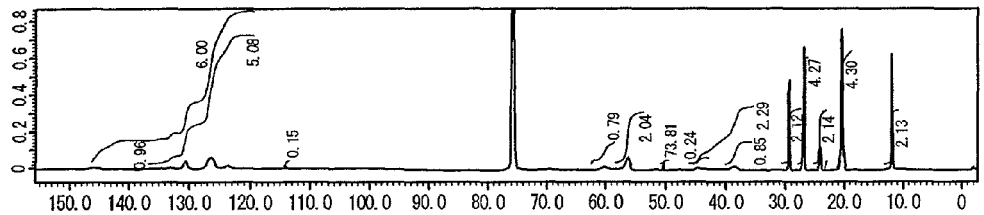
FIG. 4 is a $^{13}$C NMR spectrum of a hyperbranched polymer having a trioctylammonium group at a molecular terminal (HPS-NOct$_3$Cl) obtained in Synthesis Example 6.

The $^{13}$C NMR spectrum of the obtained HPS-NOct₃Cl is shown in FIG. 4. The peak of the methylene group attached to the chlorine atom and the peak of the methylene group attached to the ammonium group revealed that 71% of the chlorine atoms at the molecular terminals of the HPS-Cl were replaced with the ammonium groups in the obtained HPS-NOct₃Cl. The Mw of the HPS-NOct₃Cl was calculated from the Mw of the HPS-Cl (14,000) and the degree of introduction of ammonium group (71%) to be 37,000.

[Synthesis Example 7] Preparation of Pd[HPS-NOct₃Cl]-1

A 100 mL two-necked flask was charged with 8.0 g of HPS-NOct₃Cl prepared in Synthesis Example 6, 4.3 g of palladium acetate [manufactured by N.E. CHEMCAT Corporation], and 100 g of a chloroform/ethanol mixture (mass ratio 4:1) and purged with nitrogen. This mixture was heated at reflux with stirring for 17 hours.

After the mixture was cooled to 30° C., the solvent was distilled off. The resultant residue was dissolved in 100 g of chloroform and cooled to 0° C. This solution was added to 2,000 g of IPE at 0° C. for purification by reprecipitation. The precipitated polymer was filtered under reduced pressure and vacuum-dried at 60° C. to obtain 9.9 g of a complex of the hyperbranched polymer having an ammonium group at a molecular terminal and Pd particles (Pd[HPS-NOct$_3$Cl]) as a black powder.

The result of ICP emission spectroscopy showed that the Pd content of the Pd[HPS-NOct$_3$Cl] was 22% by mass. The transmission electron microscope (TEM) image showed that the Pd particles had a particle diameter of approximately 2 to 4 nm.

[Synthesis Example 8] Preparation of Pd[HPS-NOct$_3$Cl]-2

A 1 L two-necked flask was charged with 4.3 g of palladium acetate [manufactured by Kawaken Fine Chemicals Co., Ltd.] and 200 g of chloroform, and the mixture was stirred until uniform. To this solution, a solution of 18.0 g of the HPS-NOct$_3$Cl prepared according to Synthesis Example 6 in 200 g of chloroform was added with a dropping funnel. The inside of the dropping funnel was washed with 100 g of ethanol and the ethanol was added to the reaction flask. This mixture was stirred at 60° C. for 17 hours.

After the mixture was cooled to 30° C., the solvent was distilled off. The resultant residue was dissolved in 300 g of THF and cooled to 0° C. This solution was added to 6,000 g of IPE at 0° C. for purification by reprecipitation. The precipitated polymer was filtered under reduced pressure and vacuum-dried at 60° C. to obtain 19.9 g of a complex of the hyperbranched polymer having an ammonium group at a molecular terminal and Pd particles (Pd[HPS-NOct$_3$Cl]) as a black powder.

The result of ICP emission spectroscopy showed that the Pd content of the Pd[HPS-NOct$_3$Cl] was 11% by mass. The TEM image showed that the Pd particles had a particle diameter of approximately 2 to 4 nm.

[Reference Example 1] Preparation of Electroless Nickel Plating Solution A

A 300 mL beaker was charged with 12 mL of Melplate NI-871 M1 [manufactured by Meltex Inc.] and 20 mL of Melplate NI-871 M2 [manufactured by Meltex Inc.], and pure water was added to dilute the solution to a volume of 200 mL. To this solution, a 10 vol % sulphuric acid aqueous solution was added to adjust the pH of the solution to 4.5. This solution was heated to 90° C. with stirring to obtain the electroless plating solution A.

[Reference Example 2] Preparation of Electroless Nickel Plating Solution B

A 200 mL beaker was charged with 5 mL of Melplate NI-6522LF1 [manufactured by Meltex Inc.], 15 mL of Melplate NI-6522LF2 [manufactured by Meltex Inc.], and 0.5 mL of Melplate NI-6522LF Additive [manufactured by Meltex Inc.], and pure water was added to dilute the solution to a volume of 100 mL. To this solution, a 10 vol % sulphuric acid aqueous solution was added to adjust the pH of the solution to 4.5 to 4.7. This solution was heated to 80° C. with stirring to obtain the electroless plating solution B.

[Example 1] Electroless Plating on 6-Nyron Substrate 0.1 g of the Pd[HPS-NEt$_3$Cl] prepared in Synthesis Example 3 was dissolved in 9.9 g of ethanol to prepare a primer for electroless plating with a solid content of 1% by mass.

Figure 5:
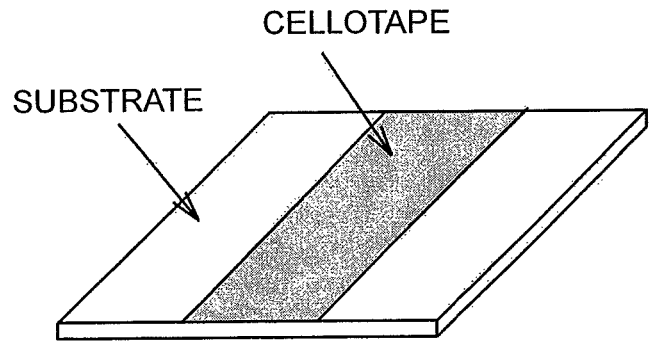
FIG. 5 is a figure illustrating a substrate with a piece of CELLOTAPE (registered trademark) stuck on the middle area for masking used in Example 1.
Figure 6:
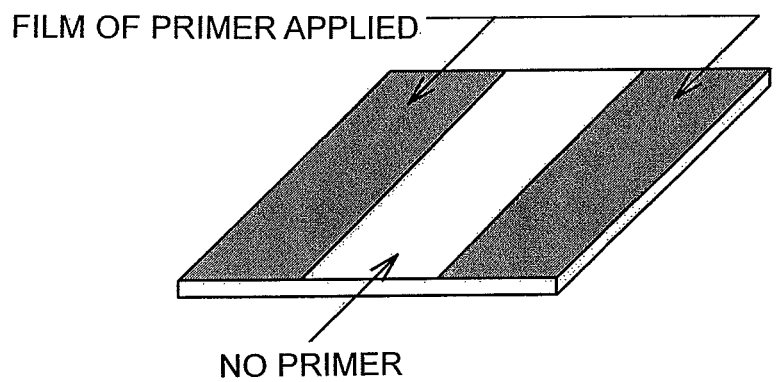
FIG. 6 is a figure illustrating a substrate having a priming layer on both side areas, obtained by coating the masked substrate as shown in FIG. 5 with a primer in Example 1.

1 mL of the primer was evenly dropped to a 50×50 mm 6-nyron substrate [manufactured by Ube Industries Ltd.] with a piece of 18 mm-wide CELLOTAPE (registered trademark) [manufactured by Nichiban Co., Ltd. CT-18S] adhering to its surface on the middle area for masking as shown in FIG. 5, and spin-coated at 500 rpm×10 seconds and 2,000 rpm×30 seconds. This substrate was dried on a hot plate at 90° C. for 30 minutes, and the CELLOTAPE (registered trademark) was peeled off to obtain a substrate having a priming layer on both side areas as shown in FIG. 6.

The obtained substrate was immersed in the electroless plating solution A at 90° C. prepared in Reference Example 1 for 20 seconds. The substrate was then removed, washed with water, and air-dried for 1 hour.

The electroless plating process yielded a metallic plating film with a metallic luster only on both side areas of the substrate on which the priming layer had been formed, and did not yield a metallic plating film on the middle area of the substrate without the primer.

[Example 2] Electroless Plating on 6,6-Nyron Substrate

The procedure in Example 1 was repeated except that a 6,6-nyron substrate [manufactured by Asahi Kasei Corporation] was used instead of the 6-nyron substrate.

The electroless plating process yielded a metallic plating film with a metallic luster only on both side areas of the substrate on which the priming layer had been formed, and did not yield a metallic plating film on the middle area of the substrate without the primer.

[Example 3] Electroless Plating on PE Substrate

The procedure in Example 1 was repeated except that a PE substrate [manufactured by KYOEI JUSHI Corporation, hard polyethylene plate] was used instead of the 6-nyron substrate.

The electroless plating process yielded a metallic plating film with a metallic luster only on both side areas of the substrate on which the priming layer had been formed, and did not yield a metallic plating film on the middle area of the substrate without the primer.

[Example 4] Electroless Plating on PP Substrate

The procedure in Example 1 was repeated except that a PP substrate [manufactured by KYOEI JUSHI Corporation] was used instead of the 6-nyron substrate.

The electroless plating process yielded a metallic plating film with a metallic luster only on both side areas of the substrate on which the priming layer had been formed, and did not yield a metallic plating film on the middle area of the substrate without the primer.

[Example 5] Electroless Plating on PVC Substrate

The procedure in Example 1 was repeated except that a PVC substrate [manufactured by Kasai Sangyo Co., Ltd., thin hard vinyl chloride plate] was used instead of the 6-nyron substrate.

The electroless plating process yielded a metallic plating film with a metallic luster only on both side areas of the substrate on which the priming layer had been formed, and did not yield a metallic plating film on the middle area of the substrate without the primer.

[Example 6] Electroless Plating on PC Substrate

The procedure in Example 1 was repeated except that a PC substrate [manufactured by TAKIRON Co., Ltd.] was used instead of the 6-nyron substrate.

The electroless plating process yielded a metallic plating film with a metallic luster only on both side areas of the substrate on which the priming layer had been formed, and did not yield a metallic plating film on the middle area of the substrate without the primer.

[Example 7] Electroless Plating on Acrylic Substrate

The procedure in Example 1 was repeated except that an acrylic substrate [manufactured by MITSUBISHI RAYON CO., LTD.] was used instead of the 6-nyron substrate.

The electroless plating process yielded a metallic plating film with a metallic luster only on both side areas of the substrate on which the priming layer had been formed, and did not yield a metallic plating film on the middle area of the substrate without the primer.

[Example 8] Electroless Plating on Polyacetal Substrate

The procedure in Example 1 was repeated except that a polyacetal substrate [manufactured by POLYPENCO JAPAN Ltd.] was used instead of the 6-nyron substrate.

The electroless plating process yielded a metallic plating film with a metallic luster only on both side areas of the substrate on which the priming layer had been formed, and did not yield a metallic plating film on the middle area of the substrate without the primer.

[Example 9] Electroless Plating on PET Substrate

The procedure in Example 1 was repeated except that a PET substrate [manufactured by POLYPENCO JAPAN Ltd.] was used instead of the 6-nyron substrate.

The electroless plating process yielded a metallic plating film with a metallic luster only on both side areas of the substrate on which the priming layer had been formed, and did not yield a metallic plating film on the middle area of the substrate without the primer.

[Example 10] Electroless Plating on ABS Substrate-1

The procedure in Example 1 was repeated except that an ABS substrate [manufactured by Mitsubishi Plastics, Inc.] was used instead of the 6-nyron substrate.

The electroless plating process yielded a metallic plating film with a metallic luster only on both side areas of the substrate on which the priming layer had been formed, and did not yield a metallic plating film on the middle area of the substrate without the primer.

[Example 11] Test for Evaluation of Adhesion of Metallic Plating Film to Substrate To the metallic plating film area on the plated substrate obtained in Example 1, a piece of 18 mm-wide CELLO-TAPE (registered trademark)[manufactured by Nichiban Co., Ltd. CT-18S] was applied and rubbed against the substrate with a spatula to securely adhere. The stuck CELLOTAPE (registered trademark) was then peeled off at a time to evaluate the adhesion of the metallic plating film to the substrate. The metallic plating film was visually inspected to find that the metallic plating film did not peel off the substrate and remained adhering to the substrate.

[Example 12] Preparation of Priming Layer by Spray Coating 1.0 g of the Pd[HPS-NBu$_3$Cl] prepared in Synthesis Example 5 was dissolved in 20 g of IPA to prepare an electroless plating primer with a solid content of 5% by mass.

The primer was sprayed onto the whole top surface of a 50×50 mm ABS substrate [manufactured by Mitsubishi Plastics, Inc.] with an air brush for 2 to 3 seconds to coat the substrate. Nitrogen at a pressure of 0.1 MPa was used for spraying, and the primer was sprayed from approximately 30 cm above the substrate to be coated. This substrate was dried on a hot plate at 80° C. for 1 hour to obtain an ABS substrate having a priming layer on the whole top surface of the substrate.

The obtained substrate was immersed in the electroless plating solution A at 90° C. prepared in Reference Example 1 for 20 seconds. The substrate was then removed, washed with water, and air-dried for 1 hour.

The electroless plating process yielded a metallic plating film with a metallic luster on the whole top surface of the substrate on which the priming layer had been formed.

[Example 13] Electroless Plating on ABS Substrate-2

0.02 g of the Pd[HPS-NOct$_3$Cl] prepared in Synthesis Example 7 was dissolved in 1.98 g of MEK to prepare an electroless plating primer with a solid content of 1% by mass.

0.5 mL of the primer was evenly dropped to a 50×50 mm ABS substrate [manufactured by Mitsubishi Plastics, Inc.], the surface of which had been washed with ethanol, and spin-coated at a slope for 10 seconds, 2,000 rpm×30 seconds and a slope for 10 seconds. The substrate was dried on a hot plate at 100° C. for 10 minutes to obtain a substrate having a priming layer on the whole top surface of the substrate.

The obtained substrate was immersed in the electroless plating solution A at 90° C. prepared in Reference Example 1 for 30 seconds. The substrate was then removed, washed with water, and air-dried for 1 hour.

The electroless plating process yielded a metallic plating film with a metallic luster on the whole top surface of the substrate on which the priming layer had been formed. No metallic plating film was formed on the inner walls of the electroless plating solution bath attributed to the dissolution of the priming layer into the electroless plating solution.

[Example 14] Electroless Plating on PI Film-1

The procedure in Example 13 was repeated except that a 50×50 mm PI film [manufactured by DU PONT-TORAY CO., LTD. Kapton (registered trademark) 250EN], the surface of which had been washed with ethanol, was used as a substrate, and that the immersion time in the electroless plating solution A was changed to 1 minute.

The electroless plating process yielded a metallic plating film with a metallic luster on the whole top surface of the film on which the priming layer had been formed. No metallic plating film was formed on the inner walls of the electroless plating solution bath attributed to the dissolution of the priming layer into the electroless plating solution.

[Example 15] Electroless Plating on PI Film-2

The procedure in Example 13 was repeated except that a 50×50 mm PI film [manufactured by DU PONT-TORAY CO., LTD. Kapton (registered trademark) 250EN], the surface of which had been washed with an aqueous sodium hydroxide solution and water in this order, was used as a substrate, and that the immersion time in the electroless plating solution A was changed to 1 minute.

The electroless plating process yielded a metallic plating film with a metallic luster on the whole top surface of the film on which the priming layer had been formed. No metallic plating film was formed on the inner walls of the electroless plating solution bath attributed to the dissolution of the priming layer into the electroless plating solution.

[Example 16] Electroless Plating on PI Film-3

The procedure in Example 13 was repeated except that a 50×50 mm PI film [manufactured by DU PONT-TORAY CO., LTD. Kapton (registered trademark) 500V], the surface of which had been washed with ethanol, was used as a substrate, and that the immersion time in the electroless plating solution A was changed to 1 minute.

The electroless plating process yielded a metallic plating film with a metallic luster on the whole top surface of the film on which the priming layer had been formed. No metallic plating film was formed on the inner walls of the electroless plating solution bath attributed to the dissolution of the priming layer into the electroless plating solution.

[Example 17] Electroless Plating on PI Film-4

The procedure in Example 13 was repeated except that a 50×50 mm PI film [manufactured by DU PONT-TORAY CO., LTD. Kapton (registered trademark) 500V], the surface of which had been washed with an aqueous sodium hydroxide solution and water in this order, was used as a substrate, and that the immersion time in the electroless plating solution A was changed to 1 minute.

The electroless plating process yielded a metallic plating film with a metallic luster on the whole top surface of the film on which the priming layer had been formed. No metallic plating film was formed on the inner walls of the electroless plating solution bath attributed to the dissolution of the priming layer into the electroless plating solution.

[Example 18] Electroless Plating on PI Film-5

The procedure in Example 13 was repeated except that a 50×50 mm PI film [manufactured by DU PONT-TORAY CO., LTD. Kapton (registered trademark) 500H], the surface of which had been washed with ethanol, was used as a substrate, and that the immersion time in the electroless plating solution A was changed to 1 minute.

The electroless plating process yielded a metallic plating film with a metallic luster on the whole top surface of the film on which the priming layer had been formed. No metallic plating film was formed on the inner walls of the electroless plating solution bath attributed to the dissolution of the priming layer into the electroless plating solution.

[Example 19] Electroless Plating on PI Film-6

The procedure in Example 13 was repeated except that a 50×50 mm PI film [manufactured by DU PONT-TORAY CO., LTD. Kapton (registered trademark) 500H], the surface of which had been washed with an aqueous sodium hydroxide solution and water in this order, was used as a substrate, and that the immersion time in the electroless plating solution A was changed to 1 minute.

The electroless plating process yielded a metallic plating film with a metallic luster on the whole top surface of the film on which the priming layer had been formed. No metallic plating film was formed on the inner walls of the electroless plating solution bath attributed to the dissolution of the priming layer into the electroless plating solution.

[Example 20] Fine Line Drawing on PI Film 1 g of the Pd[HPS-NOct$_3$Cl] prepared in Synthesis Example 7 was dissolved in 99 g of MEK, and 4 g of PG was added to 1 g of the solution to adjust the viscosity to prepare an electroless plating primer ink with a solid content of 0.2% by mass.

On a 20×15 mm PI film [manufactured by DU PONT-TORAY CO., LTD. Kapton (registered trademark) 250EN], which had been immersed in a 20% by mass aqueous potassium hydroxide solution at 50° C. for 1 minute, washed with pure water, and dried, a fine line of the electroless plating primer ink was drawn with a G-pen [manufactured by ZEBRA CO., LTD. G-pen]. The line was traced twice to provide a triple-layered line. This film was dried on a hot plate at 100° C. for 10 minutes to obtain a film having a fine line-like priming layer on the top surface of the film.

The obtained film was immersed in the electroless plating solution B at 80° C. prepared in Reference Example 2 for 1 minute. The film was then removed, washed with water, and air-dried for 1 hour.

Figure 7:
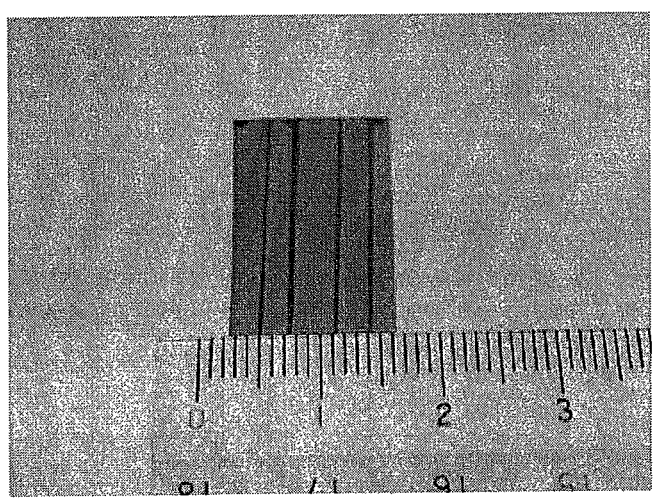
FIG. 7 is a figure showing a fine line-like metallic plating film formed on a PI film manufactured in Example 20.

The electroless plating process yielded a metallic plating film with a metallic luster in the form of fine line with a width of several hundreds of micrometers on the film on which the priming layer had been formed (FIG. 7).

[Example 21] Electroless Plating on PET Substrate with ITO 1.0 g of the Pd[HPS-NOct$_3$Cl] prepared in Synthesis Example 8 was dissolved in 99 g of IPA to prepare an electroless plating primer with a solid content of 1% by mass.

1 mL of a 5-fold dilution of the primer in IPA was evenly dropped to the whole surface of the ITO of a 50×50 mm PET substrate with ITO, the surface of which had been washed with IPA, and spin-coated at 1,000 rpm×30 seconds. The substrate was dried on a hot plate at 80° C. for 5 minutes to obtain a substrate having a priming layer on the whole surface of the ITO film.

The obtained substrate was immersed in the electroless plating solution B at 90° C. prepared in Reference Example 1 for 120 seconds. The substrate was then removed, washed with water, and dried on a hot plate at 80° C. for 5 minutes.

The electroless plating process yielded a metallic plating film with a metallic luster on the whole surface of the ITO film on which the priming layer had been formed.

The invention claimed is:

1. A primer for forming a metallic plating film on a substrate by electroless plating, the primer comprising: a hyperbranched polymer having an ammonium group at a molecular terminal and a weight-average molecular weight of 500 to 5,000,000; and a metal fine particle, wherein the hyperbranched polymer is contained in an amount of 50 to 2,000 parts by mass relative to 100 parts by mass of the metal fine particles, wherein the hyperbranched polymer is a hyperbranched polymer of Formula [1]:

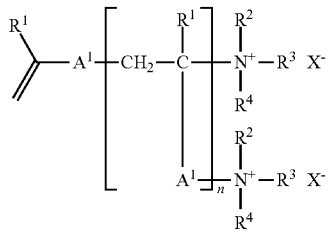

where $R^1$ are each independently a hydrogen atom or a methyl group; $R^2$, $R^3$, and $R^4$ are each independently a hydrogen atom, a linear, branched, or cyclic alkyl group having a carbon atom number of 1 to 20, a $C_{7-20}$ arylalkyl group, or —$(CH_2CH_2O)_mR^5$, where $R^5$ is a hydrogen atom or a methyl group; and m is an integer of 2 to 100, where the alkyl group and the arylalkyl group are optionally substituted with an alkoxy group, a hydroxy group, an ammonium group, a carboxy group, or a cyano group, or two groups of $R^2$, $R^3$, and $R^4$ together represent a linear, branched or cyclic alkylene group, or $R^2$, $R^3$, and $R^4$ together with a nitrogen atom to which $R^2$, $R^3$, and $R^4$ are attached optionally from a ring; $X^-$ is an anion; n is the number of repeating unit structures and an integer of 2 to 100,000; and $A^1$ is a structure of Formula [2]:

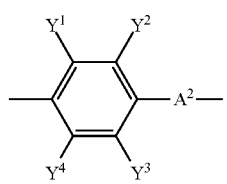

where $A^2$ is a linear, branched, or cyclic alkylene group having a carbon atom number of 1 to 30 optionally containing an ether bond or an ester bond; and $Y^1$, $Y^2$, $Y^3$, and $Y^4$ are each independently a hydrogen atom, a $C_{1-20}$ alkyl group, a $C_{1-20}$ alkoxy group, a nitro group, a hydroxy group, an amino group, a carboxy group, or a cyano group.

2. The primer according to claim 1, wherein the ammonium group of the hyperbranched polymer is attached to the metal fine particle to form a complex.

3. The primer according to claim 1, wherein the hyperbranched polymer is a hyperbranched polymer of Formula [3]:

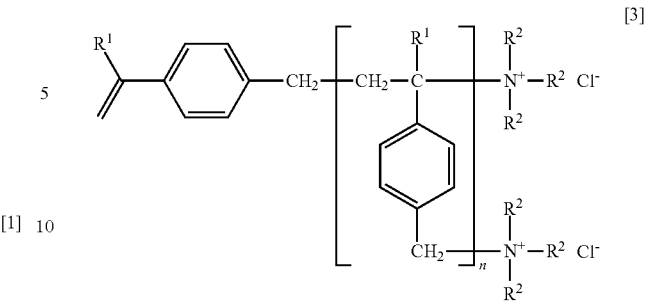

where $R^1$, $R^2$, and n have the same meanings according to claim 1.

4. The primer according to claim 1, wherein the metal fine particle is a fine particle of at least one selected from the group consisting of iron (Fe), cobalt (Co), nickel (Ni), copper (Cu), palladium (Pd), silver (Ag), tin (Sn), platinum (Pt), and gold (Au).

5. The primer according to claim 4, wherein the metal fine particle is a palladium fine particle.

6. The primer according to claim 4, wherein the metal fine particle has an average particle diameter of 1 to 100 nm.

7. A priming layer for electroless plating, obtained by forming a layer of the primer as claimed in claim 1.

8. A metallic plating film, formed by performing electroless plating on the priming layer for electroless plating as claimed in claim 7, on the priming layer.

9. A metal-coated substrate comprising:
   a substrate;
   the priming layer for electroless plating as claimed in claim 7 formed on the substrate; and
   a metallic plating film formed on and by performing electroless plating on the priming layer for electroless plating.

10. The metal-coated substrate according to claim 7, wherein the substrate is a nonconducting substrate.

11. The metal-coated substrate according to claim 7, wherein the substrate is a conducting substrate.

12. A method for forming a metal-coated substrate, the method comprising:
   a step A: coating a substrate with the primer as claimed in claim 1 to form a priming layer; and
   a step B: immersing the substrate having the priming layer in an electroless plating bath to form a metallic plating film.

13. The method according to claim 12, wherein the substrate is a nonconducting substrate.

14. The method according to claim 12, wherein the substrate is a conducting substrate.

15. The primer according to claim 1, wherein the hyperbranched polymer is contained in an amount of 100 to 1,000 parts by mass relative to 100 parts by mass of the metal fine particles.

16. The primer according to claim 1, wherein the hyperbranched polymer has a weight-average molecular weight of 1,000 to 1,000,000.

17. The primer according to claim 1, wherein the hyperbranched polymer has a weight-average molecular weight of 2,000 to 500,000.

18. The primer according to claim 1, wherein the hyperbranched polymer has a weight-average molecular weight of 3,000 to 200,000.

* * * * *